United States Patent
Roman et al.

(10) Patent No.: US 6,929,432 B2
(45) Date of Patent: Aug. 16, 2005

(54) DRILLING TOOL AND INDEXABLE DRILL BIT

(75) Inventors: Stefan Roman, Kungsgården (SE); Leif Widin, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 121 days.

(21) Appl. No.: 10/446,727

(22) Filed: May 29, 2003

(65) Prior Publication Data

US 2003/0223832 A1 Dec. 4, 2003

(30) Foreign Application Priority Data

May 29, 2002 (SE) .............................................. 0201587

(51) Int. Cl.$^7$ .............................................. B23B 51/02
(52) U.S. Cl. ..................... 408/223; 408/230; 408/233; 408/713; 407/113
(58) Field of Search .......................... 407/113; 408/223, 408/224, 227, 229, 230, 233, 713

(56) References Cited

U.S. PATENT DOCUMENTS

| | | | | |
|---|---|---|---|---|
| 4,124,328 A | * | 11/1978 | Hopkins | 408/223 |
| 4,367,991 A | * | 1/1983 | Grafe et al. | 408/224 |
| 4,563,113 A | * | 1/1986 | Ebenhoch | 408/223 |
| 4,889,455 A | | 12/1989 | Karlsson et al. | |
| 5,232,319 A | * | 8/1993 | Satran et al. | 407/114 |
| 5,340,246 A | * | 8/1994 | Tukala | 408/233 |
| 5,354,156 A | * | 10/1994 | von Haas et al. | 408/223 |
| 5,503,509 A | | 4/1996 | von Haas | |
| 5,505,569 A | * | 4/1996 | Gustafsson et al. | 407/113 |
| 5,827,016 A | * | 10/1998 | Strand | 407/115 |
| 5,954,459 A | | 9/1999 | Noguchi et al. | |
| 6,039,515 A | * | 3/2000 | Lamberg | 408/188 |
| 6,196,771 B1 | * | 3/2001 | Andersson | 407/113 |
| 6,213,231 B1 | | 4/2001 | von Haas | |
| 6,257,807 B1 | | 7/2001 | Heinloth | |
| 6,783,306 B2 | * | 8/2004 | Popke | 407/113 |

FOREIGN PATENT DOCUMENTS

JP          9-290310         11/1997

* cited by examiner

Primary Examiner—Derris H. Banks
Assistant Examiner—Michael W. Talbot
(74) Attorney, Agent, or Firm—Burns, Doane, Swecker & Mathis, LLP

(57) ABSTRACT

A drilling tool includes a basic body defining a center axis of rotation and having two chip channels and two replaceable indexable cutting bits in the form of a center bit and a periphery bit mounted in respective center and periphery pockets formed in an axially front end of the basic body. The center bit and the center pocket are spaced radially from the periphery bit and the periphery pocket along a first diametrical plane of the basic body. At least the center bit includes four identically-shaped cutting edges, one of which constituting an operative cutting edge intersected by a second diametrical plane oriented perpendicularly to the first diametrical plane. Each cutting edge of the center bit comprises first and second part edges joined by a transition edge portion. The first and second part edges of the operative cutting edge constitutes operative first and second part edges, respectively; the operative first part edge being spaced from the center axis and situated closer than the operative second part edge to an outer periphery of the basic body. An axially forwardmost portion of the operative first part edge is disposed axially forwardly of an axially forwardmost portion of the operative second part edge, and an axially forwardmost portion of an operative cutting edge of the periphery bit lies axially between the axially forwardmost portions of the operative first and second part edges of the center bit, respectively.

19 Claims, 5 Drawing Sheets

DRILLING TOOL AND INDEXABLE DRILL BIT

This application claims priority under 35 U.S.C. §§119 and/or 365 to patent application Ser. No. 0201587-3 filed in Sweden on May 29, 2002, the entire content of which is hereby incorporated by reference.

TECHNICAL FIELD OF THE INVENTION

In a first aspect, this invention relates to a drill or a drilling tool of the type that comprises on one hand a basic body, which has two chip channels extending rearwards from a front end and is rotatable around a geometrical center axis, and on the other hand two replaceable and indexable bits in the form of a center bit and a periphery bit, which are mounted in pockets formed in the front end of the basic body adjacent to the chip channels. The center bit is mounted in a first pocket or center pocket adjacent to the center axis, and the periphery bit is mounted in a second pocket or periphery pocket adjacent to the periphery of the basic body. The pockets are spaced-apart from each other along a first diametrical plane containing the axis, and the center bit being located in a position in which an operative cutting edge intersects a second diametrical plane oriented perpendicularly to the first plane.

Drills of the above generally mentioned kind, denominated short hole drills by those skilled in the art, are most commonly used for blast drilling holes in workpieces of metal, such as steel, aluminum or the like. However, the tools can also work in other materials than metal.

In a second aspect, the invention also relates to an indexable bit having a quadrangular basic shape and four similar cutting edges, suited for short hole drills. An important feature of this bit is the fact that the four cutting edges are similar. In this way, the bit may be readjusted or indexed to four different positions in the appurtenant pocket in order to enable utilization of no less than four cutting edges before the bit finally has to be discarded.

Prior Art

In previously known short hole drills of the type that uses two bits having four similar, operatively serviceable cutting edges, one of the bits—most commonly the center bit—is arranged with the operative cutting edge thereof placed axially in front of the operative cutting edge of the second bit (periphery bit). When a hole is to be formed in a workpiece, the entire operative cutting edge of the center bit is brought to enter or cut into the workpiece before the cutting edge of the periphery bit. It has certainly always been an aim within the technique in question to reduce the axial distance difference between the operative cutting edges of the periphery bit and the center bit to a minimum, within the scope of given feed rates, but nonetheless the cutting edges of the two bits in their entirety enter the workpiece in two different steps. This results in the cutting forces becoming large at entering. The two spaced-apart bits use great force to "clutch" the material in the workpiece, the drill being subjected to large radial and tangential forces disturbing the balance of the drill. Imbalance of this type is particularly troubling when the drill has a length that is 4 to 5 times larger than the diameter, or more.

Objects and Features of the Invention

The present invention aims at obviating the above-mentioned disadvantages of previously known drills and at providing an improved drill. Therefore, a primary object of the invention is to provide a drill that is exposed to only moderate cutting forces at entering a workpiece, while guaranteeing good balance. An additional object is to provide a drill, the center and periphery bits of which separately generates whole chips in connection with the chip removing. Furthermore, one of the bits, viz. the center bit, should be able to protect the inner corner between the operative cutting edge of the periphery bit and an inoperative cutting edge turned towards the center of the drill, so that the cutting edge that is inoperative for the time being is kept intact until the same is made active by indexing.

At least the primary object of the invention is attained by a drilling tool which comprises a basic body defining a center axis of rotation and having two chip channels extending rearwards from a front end thereof, and two replaceable and indexable cutting bits in the form of a center bit and a periphery bit. The center bit and the periphery bit are mounted in respective center and periphery pockets formed in the axially front end of the basic body adjacent to the chip channels. The center bit and the center pocket are spaced radially from both the periphery bit and the periphery pocket along a first diametrical plane of the basic body. At least the center bit includes four identically shaped cutting edges. One of the cutting edges constitutes an operative cutting edge intersected by a second diametrical plane that is oriented perpendicularly to the first diametrical plane. Each cutting edge of the center bit comprises first and second part edges spaced apart by a transition edge portion. The first and second part edges of the center bit's operative cutting edge constitute operative first and second part edges, respectively. The operative first part edge is spaced from the center axis and is situated closer than the operative second part edge to an outer periphery of the basic body. An axially forward most portion of the operative first part edge is disposed axially forwardly of an axially forwardmost portion of the operative second part edge. An axially forwardmost portion of an operative cutting edge of the periphery bit lies axially between the axially forwardmost portions of the operative first and second part edges of the center bit, respectively.

Furthermore, the invention relates to an indexable bit, which is suited to be used in the drill. The bit has a generally quadrangular basic shape and comprises four identical cutting edges. Each cutting edge comprises first and second part edges joined together by a transition edge portion. The second part edges lie tangent to an imaginary inscribed reference circle. A diametrical reference plane of the circle which extends parallel to any one of the second part edges divides the bit into halves which are mirror images of one another. The first part edge that is associated with the one second part edge is spaced radially from the diametrical reference plane by a greater distance than the second part edge. The transition edge portion joins the associated first and second edge parts by a convex curve and a concave curve, respectively. A line tangent to both the concave curve and the convex curve forms an angle of 10–30 degrees with the diametrical reference plane.

As is seen in the subsequent detailed description, the invention is based on the intention to form at least the four cutting edges of the center bit with at least two part edges, which are spaced-apart by a transition edge portion, and a radially outer part edge of which is at least partly positioned axially before the radial inner part edge or edges, the operative cutting edge of the periphery bit being at least partly positioned on one hand axially behind the radially outer part edge of the center bit, and on the other hand axially before the inner part edge or edges of the operative cutting edge of the center bit. Expressed in other words, an imaginary, geometrical cross plane extending perpendicularly to the center axis of the drill and being tangent to the front portion of the operative cutting edge of the periphery bit can be said to intersect the transition edge portion between the radially outer and inner part edges, respectively, of the center bit. By the geometry and the location of the bits according to the invention, it is attained that only a certain part of the center bit in a first step cuts into the workpiece in connection with the entering of the drill, and then at least a part of the operative cutting edge of the periphery bit cuts into the workpiece before other portions of the operative cutting edge of the center bit engage with the workpiece. The advantageous consequence from this is that the center bit initially applies only moderate cutting forces, and as soon as the operative cutting edge of the periphery bit begins to cut into the workpiece, a balancing is achieved by the forces that act on the diametrically opposed bits before the inner part edge of the center bit finally enters the workpiece. Thus, contrary to prior art, the operative cutting edge of the center bit does not in its entirety clutch the workpiece before the operative cutting edge of the periphery bit is brought to engagement with the material.

The released chip remains whole, in spite of the fact that the same is produced by two grade separated part edges. In blast drilling of a hole, whole chips may be handled in a considerably simpler way than split chips.

Additional Elucidation of Prior Art

By Kojima U.S. Pat. No. 5,971,676 (Kyocera Corporation), a U-drill is previously known, the center and periphery bits of which have cutting edges that are formed with two part edges, spaced-apart by a transition portion, which in an active state are located axially spaced-apart. However, in this case, the cutting edge of the periphery bit is not arranged to enter the workpiece in a step following the fact that entering of a first part edge of the center bit has taken place, but prior to entering of the radially inner part edge or edges of the center bit takes place. Furthermore, U.S. Pat. No. 5,971,676 primarily aims at bringing about a partition of the released chips, rather than facilitating entering.

BRIEF DESCRIPTION OF THE DRAWINGS

The objects and advantages of the invention will become apparent from the following detailed description of preferred embodiments thereof in connection with the accompanying drawings and in which like numerals designate like elements.

DESCRIPTION OF PREFERRED EMBODIMENTS OF THE INVENTION

Figures 1, 2:
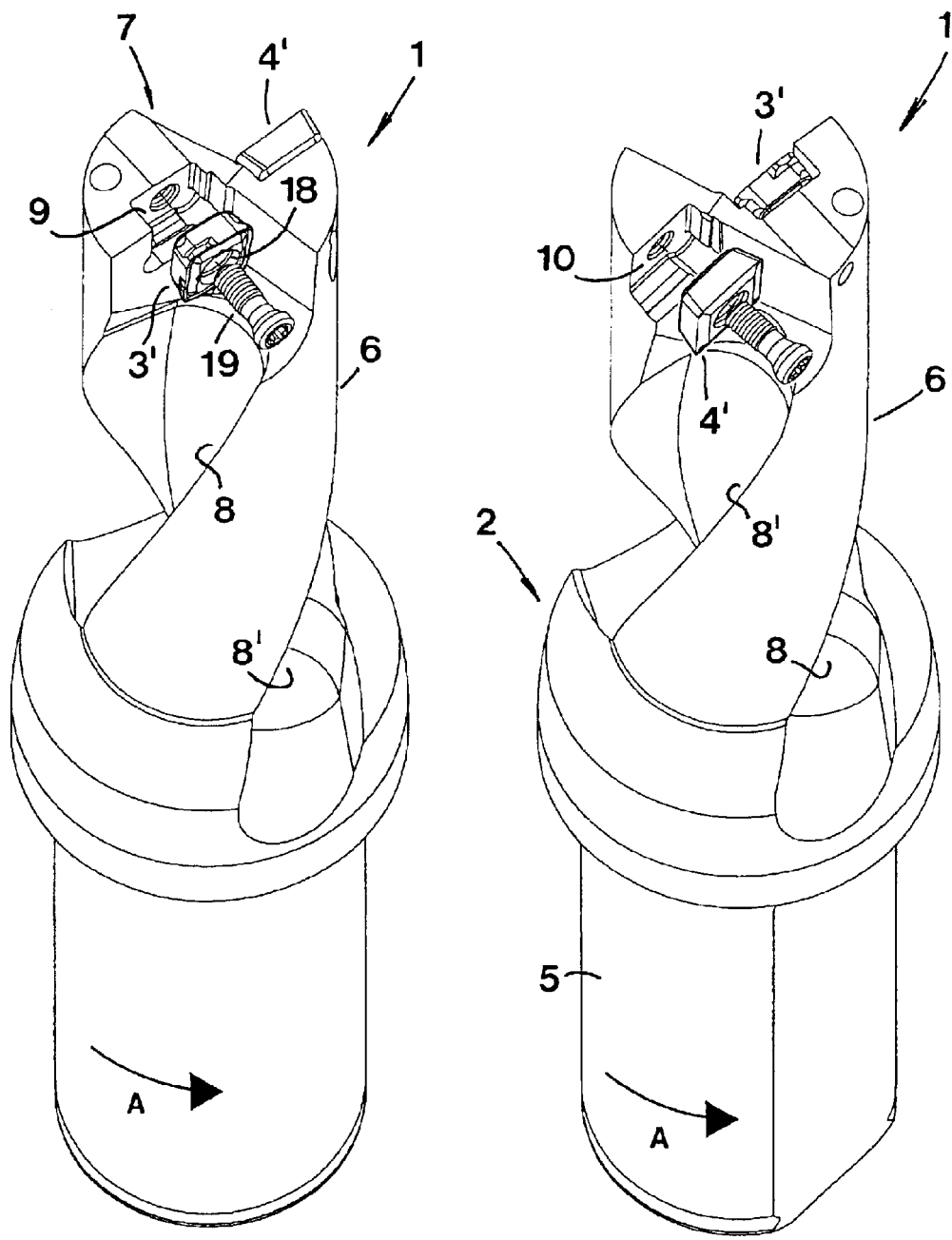
FIG. 1 is a first perspective view of a drill according to the invention, the drill being shown with the tip thereof facing upwards and the center bit thereof removed from an appurtenant pocket, while the periphery bit being shown in a mounted state.
FIG. 2 is a second perspective view of the drill rotated by 180 degrees relative to FIG. 1, and showing the periphery bit in a released state and the center bit in a mounted state.

In FIGS. 1 and 2, a tool in the form of a drill is shown, generally designated 1, which includes a basic body 2 as well as two cutting bits 3', 4'. The basic body 2 is in the example formed with a rear fastening part 5 and a front, long narrow shank 6 of cylindrical basic shape. The length of the shank 6 may vary most considerably. For the sake of clarity, the shank is shown with a limited length. However, in practice, the invention is applicable to drills with considerably longer shanks, e.g. of a length of at least 3×D (wherein D equals the diameter of the drill). From the front end or tip, designated 7, in which the bits are arranged, two chip channels 8, 8' extend, which advantageously are helicoidal. Adjacent to the front ends of said chip channels, pockets 9, 10 are formed for receipt of the bits 3', 4'. More precisely, a first pocket 9 is located near the geometrical center axis of the drill for receipt of the bit 3', which constitutes a so-called center bit. The bit 4', which forms a "periphery bit," is mountable in a second, peripherically positioned pocket 10.

As will be explained, the invention involves configuring and positioning the center bit and the periphery bit so that when the drilling tool enters a workpiece, the workpiece is engaged by the cutting edge of the periphery bit after a radially outer part of the center bit's cutting edge engages the workpiece and before a radially inner part of the center bit engages the workpiece. Thus, the center bit initially applies only moderate cutting forces, and when the periphery bit thereafter begins to cut, a balancing of the forces acting on the two bits is achieved before the rest of the center bit's cutting edge engages the workpiece.

Figure 3:
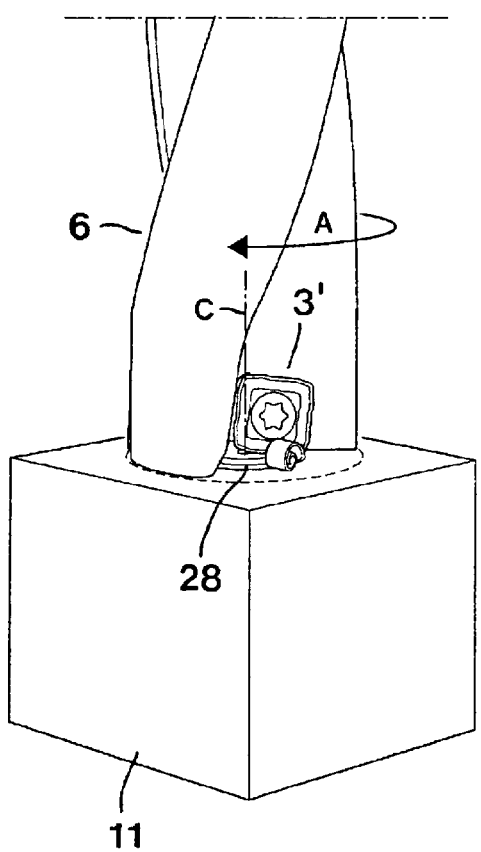
FIG. 3 is a simplified perspective view illustrating how the center bit of the drill partially enters a workpiece in an initial stage of the entire entering phase of the drill.
Figure 4:
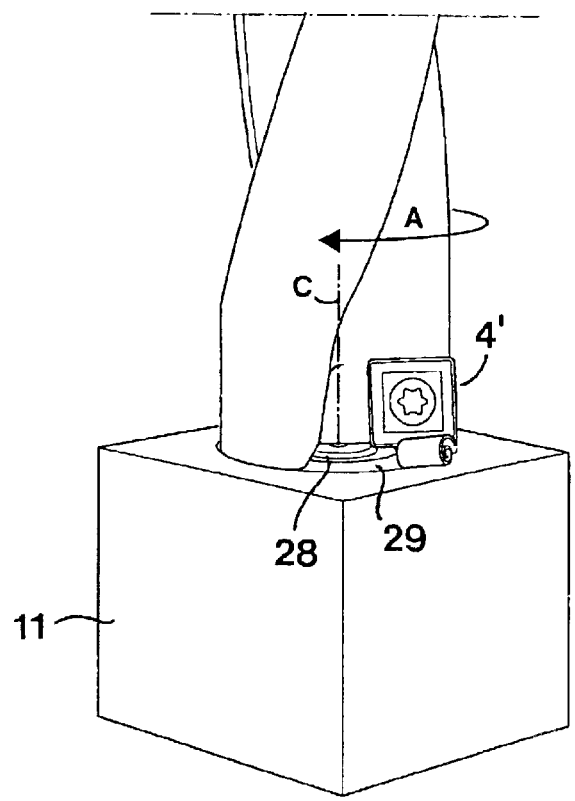
FIG. 4 is a perspective view corresponding to FIG. 3, showing how the periphery bit—following further rotation of the drill—has commenced its entering of the workpiece.

In FIGS. 3 and 4, the drill is shown together with a schematically outlined workpiece 11. In these drawing figures, the geometrical center axis C of the drill is outlined by dash-dotted lines. In all of the FIGS. 1–4, the direction of rotation of the drill is illustrated by means of the arrow A.

Figure 5:
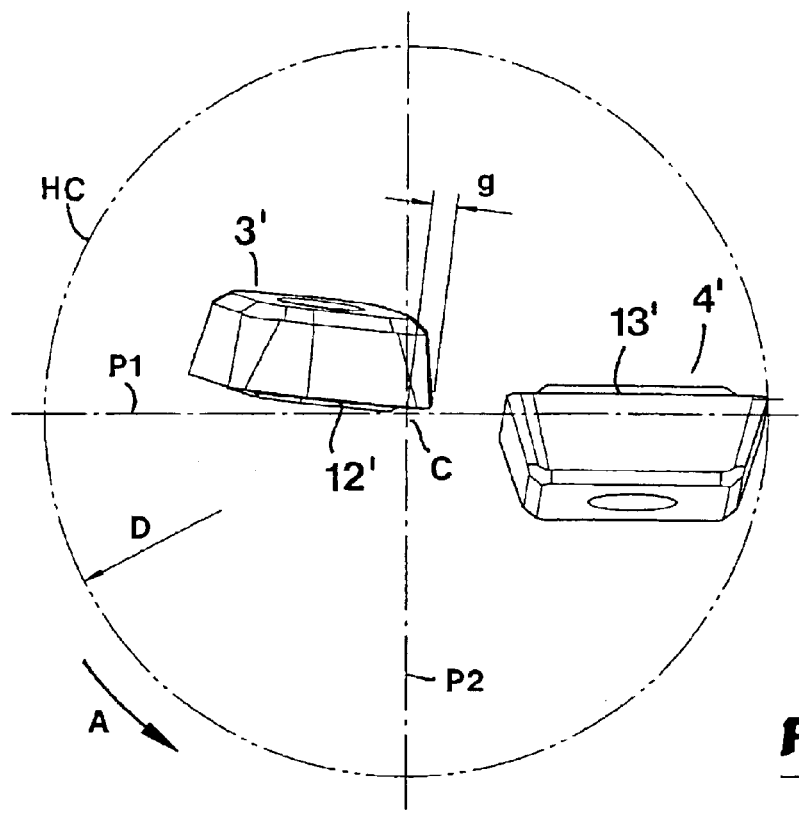
FIG. 5 is a schematic view only illustrating the center and periphery bit, respectively, of the drill, two geometrical diametrical planes intersecting each other, as well as the bore diameter for the drill being illustrated by dash-dotted lines.

In FIG. 5, only the two bits 3', 4' of the drill are shown, more precisely inserted into a geometrical figure consisting of dash-dotted lines, which explains the geometrical location of the bits in relation to the center axis C. More precisely, the figure shows how the center axis C is intersected by two imaginary diametrical planes P1, P2, which extend axially along the longitudinal direction of the drill and perpendicularly to each other. The diameter of the drill is designated D, i.e. substantially the diameter that a hole drilled in the workpiece obtains, and that is determined by the distance between the center axis C and the outermost part of a cutting edge on the periphery bit 4'.

Figure 8:
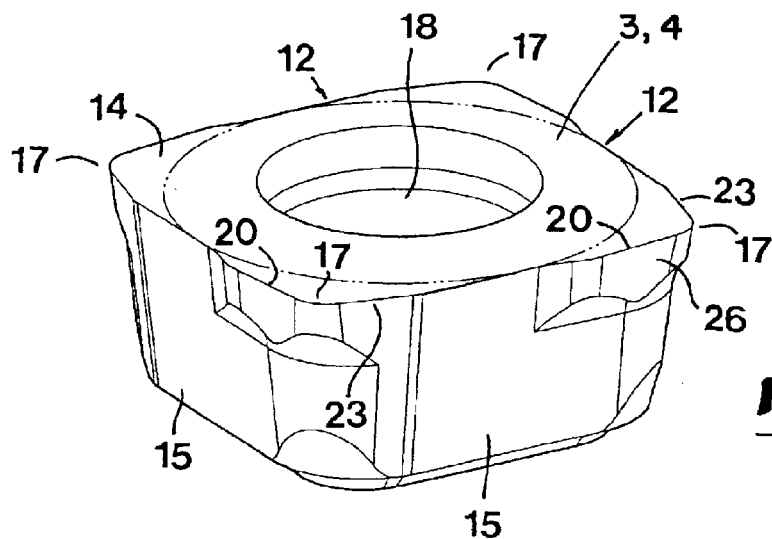
FIG. 8 is a perspective view of a preferred embodiment of a bit according to the invention.
Figure 9:
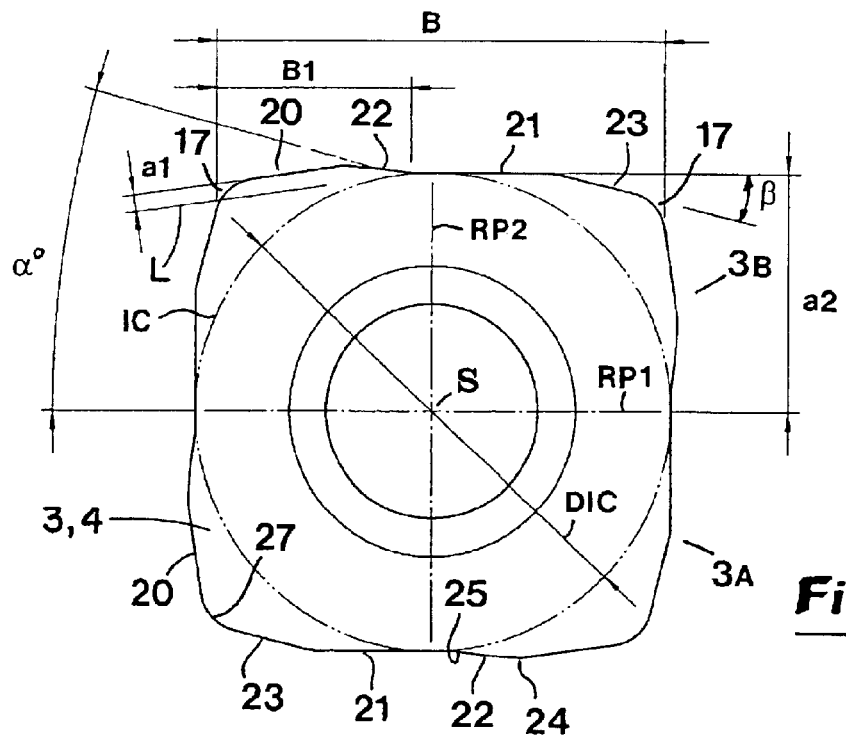
FIG. 9 is a plan view from above of the bit according to FIG. 8.
Figure 10:
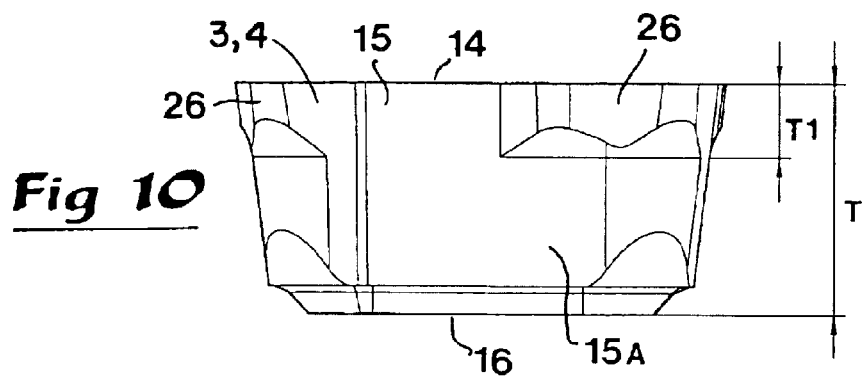
FIG. 10 is a side view of the bit according to FIGS. 8 and 9.

As is seen in FIG. 5, the bits 3', 4' (and thereby the appurtenant pockets 9, 10) are spaced-apart from each other along the first diametrical plane P1. More precisely, the periphery bit 4' is entirely separated from the second diametrical plane P2, which intersects the center axis C, while the major part of the center bit 3 is situated on the opposite side of the diametrical plane P2. However, a small portion of the center bit 3' intersects the plane P2 (see the measure g), involving that a short, inner portion of the operative cutting edge of the center bit intersects the diametrical plane P2. It should also be noted that the radially outer part of the center bit 3' is situated at a considerable distance from the hole circle HC. However, as is clearly seen in FIG. 5, the width and location of the bits are of such a kind that the operating ranges of the bits overlap each other during rotation of the drill. It should also be noted that the center bit 3' is essentially positioned behind the diametrical plane P1 as seen in the direction of rotation A. Furthermore, the center bit 3' is generally inclined in relation to the plane P1, more precisely in a way so that the operative cutting edge 12 of the bit is inclined at a certain, moderate angle to the plane P1 as can be seen in FIG. 5. However, an analogous, operative cutting edge 13 on the periphery bit 4' is in the preferred embodiment located in front of the diametrical plane P1, as seen in the direction of rotation. Furthermore, the cutting edge 13 is approximately parallel to the plane P1. Reference is now made to FIGS. 8–10, illustrating a preferred embodiment of a drill bit according to the invention. This bit may advantageously be used as a center bit in the described drill, although it is also feasible to (in a mirror-inverted embodiment) use the same as a periphery bit. As is seen in FIGS. 8–10, the bit is of quadrangular basic shape and includes four similar cutting edges, generally designated 12. The individual cutting edge 12 is situated in the area between a top side 14 and an individual side surface 15, which extends between the top side 14 and the area of a plane bottom side 16. Four corners on the bit are generally designated 17. In the example, the top side 14 of the bit is illustrated in the form of a plane surface. In practice, the same top side may, however, be formed with highly varying topography and, among other things, include chip breakers of different types. It should furthermore be pointed out that the bit has a center hole 18 for a screw 19 (see FIG. 1), by means of which the bit may be fixed in the appurtenant pocket in the basic body.

A characteristic feature of the bit illustrated in FIGS. 8–10 is that each individual cutting edge 12 is formed with first and second part edges 20, 21, transforming into each other via a transition edge portion 22. In the shown, preferred example, the individual cutting edge 12 also includes a third part edge 23, extending at an obtuse angle to the second part edge 21.

An inscribed circle, designated IC, (the center of which is designated S) is tangent to the second part edges 21 of each of the four cutting edges. The first part edges 20 are spaced outwardly from the circle IC, as can be seen in FIG. 9, for example. In said inscribed circle, the diameter of which is designated DIC, two diametrical planes RP1 and RP2, respectively, serving as reference planes, are inserted, each extending parallel to the two part edges 21 of opposite pairs of cutting edges. Each such imaginary reference plane divides the bit into two halves, which are reverse mirror images of one another. Thus, the reference plane RP1 separates a lower half 3A from an upper half 3B in FIG. 9. If one of said halves 3A, 3B would be hypothetically inverted, i.e. is swung about an axis disposed parallel to the plane RP2 so that the right part thereof moves to the left, the two halves would become mirror-invertedly symmetrical.

As is clearly seen in FIG. 9, at least a portion of the first part edge 20 is located at a larger distance from the reference plane RP1 than the second part edge 21. Therefore, if the bit according to FIG. 9 would enter a workpiece (not shown) positioned above the drawing figure, at least a portion of the part edge 20 would come into engagement with the workpiece before the second part edge 21. The transition edge portion 22 between the part edges 20, 21 is defined by a convex curve 24 (see at the bottom of FIG. 9) adjacent to the first part edge 20, as well as a concave curve 25 adjacent to the second part edge 21. In this connection, an imaginary or actual, straight tangent line extends between the curves 24, 25 at a certain angle α to the reference plane RP1 (and the reference plane RP2, respectively). Said angle α should amount to at least 10° and at most 30°, suitably at least 13° and at most 25°. In the shown example, the angle α is approximately 15°.

Via the transition edge portion 22, a radial distance difference a1 (i.e., "radial" with reference to the circle IC) is provided between the first part edge 20 and the inscribed circle IC. That is, an imaginary line L tangent to the circle IC at a point of intersection between the transition portion 22 and its associated second part edge 21 is parallel to the associated first part edge 20 and spaced therefrom by the distance a1. In practice, said distance difference a1 should amount to at least 2% and at most 15%, suitably at most 5% of the diameter DIC of the inscribed circle. The distance between the reference plane RP1 and the second part edge 21, parallel to the same, is designated a2. This measure a2 equals the radius of the inscribed circle IC.

Although it is feasible, per se, to allow the second part edge 21 to extend continuously all the way up to a corner 17, the third part edge 23 has, as mentioned above, been formed between the corner 17 and the part edge 21. The angle β between the part edge 23 and an imaginary extension of the part edge 21 may vary most considerably, but should amount to at least 1° and at most 30°, suitably at least 10° and at most 20°. In the example, the angle β amounts to approx. 16 degrees.

As is seen in FIGS. 8 and 10, the first part edge 20 of a given cutting edge 12 and the third part edge 23 of a nearby cutting edge 12 are formed on a common, bracket-like projection 26 that extends from the side of a main part of the bit. The thickness T1 of the projection 26 is smaller than the total thickness T of the bit. Therefore, in the area of the side located below the projection or shoulder 26, a partial support surface 15A is present, which extends in the extension of the main support surface that is formed by the side surface 15 that extends from the top side 14 of the bit to the area of the bottom side 16 of the bit. By the fact that the part edges 20, 23 are formed on a projection of limited thickness—contrary to a projection extending all the way from the top side to the area of the bottom side—a substantially L-shaped support surface 15, 15A of optimum area is obtained. The thickness T1 should amount to 25–40% of the total thickness T of the bit. In the example, the thickness T1 amounts to approx. 33% of the total thickness T. Thus, along considerably more than half of the height of the bit, a lower support surface extends along the entire width of the bit.

In connection with FIGS. 8–10, it should furthermore be noted that the transition or corner 17 between nearby part edges 20, 23 consists of a convexly rounded edge portion 27 of a suitable radius. In this connection, it should also be mentioned that the individual part edge 20, 21 and 23, respectively, either may be straight, as is shown in FIGS. 8–10, or slightly arched with at least partially convex or concave basic shape. For instance, the part edge 20 may be of a convex basic shape and the part edge 21 of a concave basic shape, and the possibly occurring third part edge 23 may be convex.

In FIG. 9, B designates the length of the cutting edge 12 between two corners 17. The measure B1 designates the total length of the part edge 20 and the transition portion 22, such as said length is counted from a corner 17 to the point where the transition portion 22 transforms into the second part edge 21. As is visible to the naked eye in FIG. 9, the measure B1 is smaller than half of the measure B. In the example, B1 amounts to 43% of B. In practice, the length B1 should amount to at least 10% and at most 60%, suitably at least 20% and at most 50%, of the length B, in order to protect, along a radial distance of the corresponding length, an inner and front, inoperative corner edge on a periphery cutting edge following during rotation of the drill.

Figure 6:
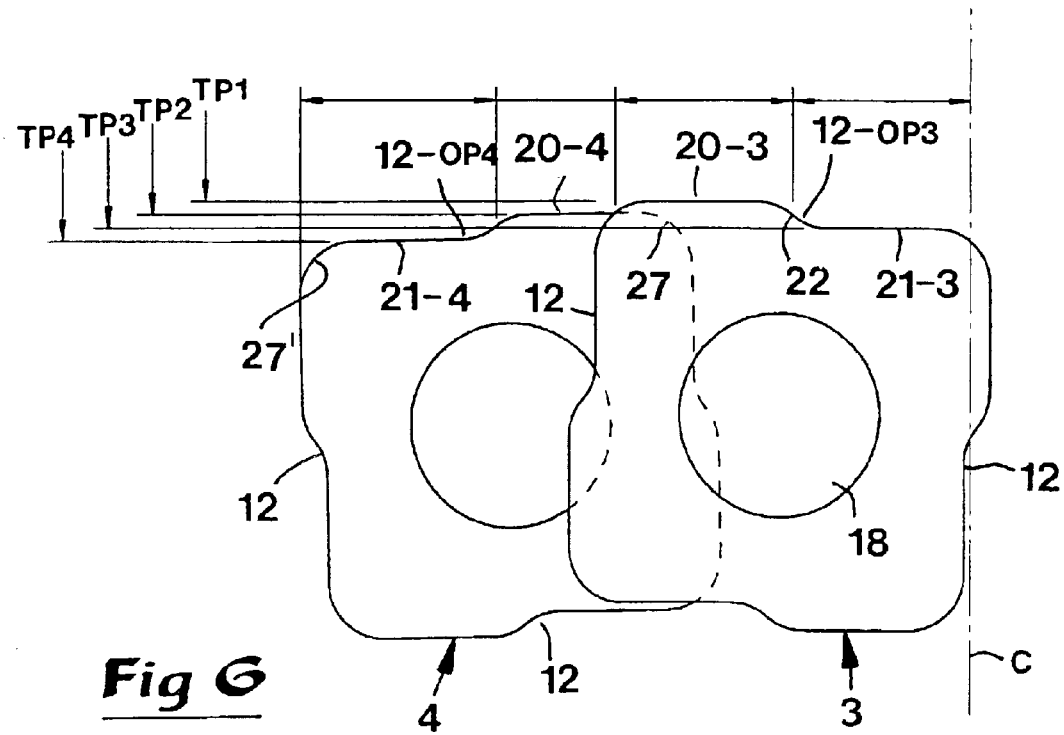
FIG. 6 is a view showing the two bits of the drill in schematically-represented form and at one and the same side (to the left) of the center axis of the drill, the center bit being shown closer to the observer than the periphery bit, the two bits being of mirror-inverted shape, which is feasible, although not preferred.

Reference is now made to FIG. 6, schematically illustrating the primary function of the invention, more precisely by means of two mirror-invertedly similar bits, the center bit 3 of which, shown by an unbroken contour line, is positioned closest to the center axis C of the drill, while a periphery bit 4, shown by a partly dashed contour line, is hypothetically assumed to be placed immediately behind the center bit, seen in the direction of rotation (in practice, the periphery bit 4 is, however, in a position displaced approximately a half revolution in relation to the center bit, see FIG. 5). In FIG. 6, 12-OP3 designates an operative cutting edge on the center bit 3, while an operative cutting edge on the periphery bit 4 is designated 12-0P4. The other three cutting edges 12 on the respective bit are inoperative (i.e., inactive). As is seen in the figure, axially spaced-apart cross planes (TP1, TP2, TP3, TP4), which extend perpendicularly to the center axis C.

Figure 7:
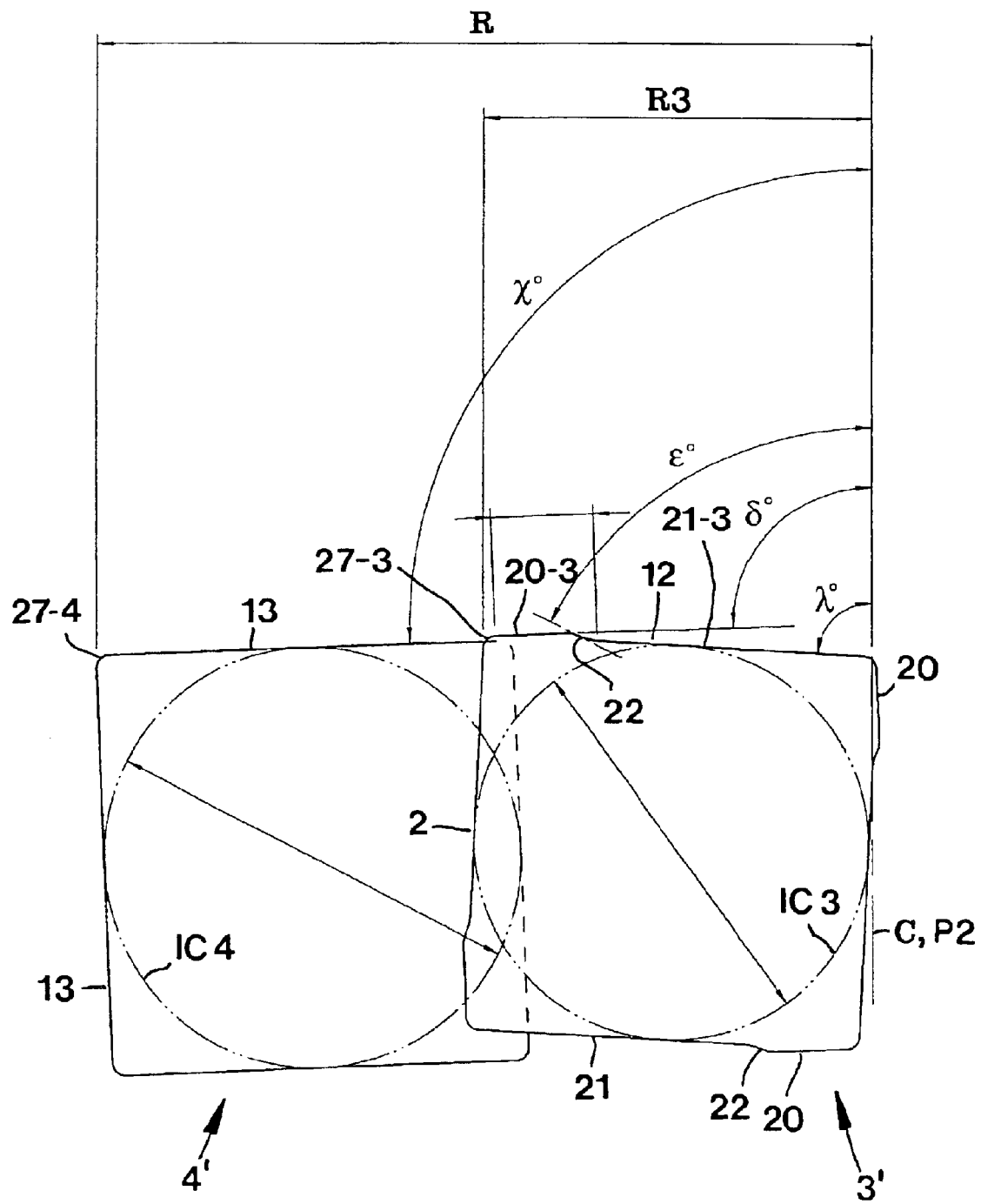
FIG. 7 is a geometrical view in the direction of cutting, which in the same way as FIG. 6 shows the two bits on one and the same side of the center axis of the drill, the center bit being closest to the observer, the bits being of different design according to a preferred embodiment of the invention.

It should be noted that the bits 3, 4 are shown schematically in FIG. 6, i.e., the part edges 20-3 and 21-3 are shown as mutually parallel (also true of the edge parts 20-4, 21-4). Preferably, however, at least the center bit 3 would be shaped as shown in FIG. 7 or 9 wherein the part edges 20-3 and 21-3 are non-parallel. The significance of the present invention, relates to the sequence in which the edges 20-3, 20-4 and 21-3 engage the workpiece upon entry of the drilling tool into the workpiece, i.e., the significance involves the relative location of the axially forwardmost portions of those three edges.

Thus, the axially forwardmost portion of the first, radially outer part edge 20-3 of the operative cutting edge of the center bit 3 is positioned in a first cross plane TP1. In the cross plane TP2, the axially forwardmost portion of the first, radially inner part edge 20-4 of the operative cutting edge of the periphery bit 4 is located. The axially forwardmost portion of the second part edge 21-3 of the center bit 3 is located in the next cross plane TP3. Finally, the axially forwardmost portion of the second part edge 21-4 which is situated radially outside the part edge 20-4 of the periphery bit 4, is positioned in a fourth cross plane TP4. In practice, the axial distance difference between the different cross planes varies depending on the feeding in question for the individual drill. Generally, it may be said that said distance difference has to amount to at least 50% of the feed rate. Suppose that the feed rate is to amount to 0.4 mm/revolution. Then, the distance difference between for instance the cross planes TP1 and TP2 has to amount to at least 0.20 mm. In practice, the distance difference should however be selected somewhat larger, e.g. to 60–90%, suitably approx. 75% of the feeding per revolution.

When the drill enters a workpiece, the radially outer part edge 20-3 of the center bit 3 in a first step engages the material (i.e., "radially" with reference to the axis of rotation of the drill). Following further rotation of the drill, the radially inner part edge 20-4 of the periphery bit 4 then engages the material in a second step. In a third step, the entire cutting edge 12-OP3 of the center bit engages the material as also the part edge 21-3, positioned in the cross plane TP3, cuts in. Only in a fourth step, the radially outer, second part edge 21-4 of the periphery bit cuts into the material. By the fact that the different part edges on the bits 3, 4 cut into the material in different stages of the entering phase, a reduction of the magnitude of the individual cutting forces is guaranteed, as well as a distribution of the forces to four radially different, ring-shaped areas.

In connection with FIG. 6, it should furthermore be pointed out that the radially inner corner edge 27—which in this indexing position is inoperative—of the periphery bit 4 shown at the top is in a protected position behind the outer, operative corner area of the center bit 3, as seen in the direction of rotation of the bits. In other words, said corner edge 27 will travel freely in a groove recessed in the workpiece by the part edge 20-3. Therefore, following indexing of the bit, when the corner edge forms an operative corner edge of the type that is shown at 27', the same is undamaged and fresh.

Reference is now made to FIG. 7, which shows an alternative, and in practice preferred embodiment, according to which the center and periphery bits 3', 4' are of different designs, i.e., of the type shown in FIGS. 1–5 and 7. More precisely, the center bit 3' is formed in principally the same way as the bit according to FIGS. 8–10 so far that the four cutting edges 12 of the bit include first and second part edges, while the periphery bit 4' is genuinely square so far that each one of the four cutting edges 13' thereof consists of substantially straight, continuous edges. In the same way as in FIGS. 8–10, the different part edges of the center bit 3' are designated 20', 21' and the transition edge portions are designated 22'. The inscribed circle for the center bit 3' is designated IC3, while the corresponding inscribed circle for the periphery bit is designated IC4. R designates the radius of the drill, such as the same is represented by the radial distance between the center axis C and the outer corner edge 27-4 on the periphery bit 4'. It is axiomatic that said radius R determines the diameter of the recessed hole (D=2R). The radius R3 of the center bit 3' is determined by the distance between the center axis C and the upper, outer corner edge 27-3 of the center bit.

The operative cutting edge 13' (at the top in FIG. 7) is inclined and extends at an angle $\chi$ to the center axis C of the drill. Said angle should amount to at least 91° and at most 94°, preferably at least 92° and at most 93°. This means that the outer, inoperative cutting edge 13' of the periphery bit 4', extending axially rearwards from the outermost, active corner edge 27-4, obtains a clearance angle within the range of 1–4°, suitably 2–3°.

The symbol $\delta$ designates the angle between the active first part edge 20-3 of the center bit 3' and the center axis C of the drill as viewed in the direction of cutting (FIG. 7). Said angle should amount to at least 90° and at most 93°, and preferably be within the range of 91–92°. The angle $\epsilon$ between the center axis C of the drill and the transition edge portion 22 between the part edges 20-3 and 21-3 should amount to at least 60° and at most 70° (observe that the angle ε, which defines the geometrical position of the transition edge portion 22 in the mounted state of the center bit, should not be mistaken for the angle α in FIG. 9).

The angle λ between the center axis C and the second part edge 21-3 of the center bit may advantageously amount to at least 84° and at most 87° as viewed in the direction of cutting (FIG. 7).

Reference is now made to FIG. 3, which illustrates a center bit 3' according to FIG. 7 during initial entering of the workpiece 11, as well as FIG. 4, which shows a periphery bit 4' according to FIG. 7, likewise during initial entering of the workpiece. As has been described above, the entering of the two bits of the workpiece takes place in several different steps. In the first step, which is shown in FIG. 3, a first part edge 20' on the operative cutting edge of the center bit 3' has commenced the separation of a chip while forming a groove 28 in the workpiece. Said groove is radially distanced from the center axis of the drill. In the next step, which is shown in FIG. 4, the periphery bit 4' has commenced its entering of the workpiece. By the fact that the active cutting edge 13' of the periphery bit 4' is somewhat inclined, the radially inner corner thereof will initially be housed in the recessed groove 28, and then the radially outer part of the cutting edge 13' will successively commence recession of a second groove 29 in the workpiece. Following further rotation and simultaneous axial feeding of the drill, also the second part edge 21' on the center bit 3' cuts into the material (this step is not shown in FIG. 3 or 4), both bits entering the workpiece completely. When the operative cutting edge of the center bit in its entirety has cut into the material, i.e. entering of both the part edges 20-3, 21-3 has taken place, a continuous chip is separated, in that the transition edge portion 22', as a consequence of the chosen angle ε, forms a gentle or flat transition between the part edges.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. Drilling tool comprising a basic body defining a center axis of rotation and having two chip channels extending rearwards from an axially front end thereof, and two replaceable and indexable cutting bits in the form of a center bit and a periphery bit mounted in respective center and periphery pockets formed in the axially front end of the basic body adjacent to the chip channels; the center bit and the center pocket spaced radially from the periphery bit and the periphery pocket along a first diametrical plane of the basic body; at least the center bit including four identically-shaped cutting edges, one of which constituting an operative cutting edge intersected by a second diametrical plane oriented perpendicularly to the first diametrical plane; each cutting edge of the center bit comprising first and second part edges joined by a transition edge portion; the first and second part edges of the operative cutting edge constituting operative first and second part edges, respectively; the operative first part edge being spaced from the center axis and situated closer than the operative second part edge to an outer periphery of the basic body; wherein an axially forwardmost portion of the operative first part edge is disposed axially forwardly of an axially forwardmost portion of the operative second part edge; and wherein an axially forwardmost portion of an operative cutting edge of the periphery bit is axially between the axially forwardmost portions of the operative first and second part edges of the center bit, respectively.

2. The drilling tool according to claim 1 wherein the operative first and second part edges are linear and form an angle greater than zero relative to one another.

3. The drilling tool according to claim 2 wherein the operative first part edge forms an obtuse angle with the second diametrical plane, and the operative second part edge forms an acute angle with the second diametrical plane.

4. The drilling tool according to claim 1 wherein the operative second part edge is linear; the second diametrical plane intersecting the operative second part edge and forming an angle therewith of 84–87 degrees.

5. The drilling tool according to claim 4 wherein the center bit includes a top side facing in a direction of rotation and a bottom side facing away from the direction of rotation; the operative first part edge being linear and forming an angle of 90–93 degrees with the second diametrical plane as the center bit is viewed in the direction of rotation.

6. The drilling tool according to claim 5 wherein the axially forwardmost portion of the operative cutting edge of the periphery bit lies on a section of such operative cutting edge that is linear and forms an angle of 91–94 degrees with the second diametrical plane.

7. The drilling tool according to claim 1 wherein the center bit includes a top side facing in a direction of rotation and a bottom side facing away from the direction of rotation; the operative first part edge being linear and forming an angle of 90–93 degrees with the second diametrical plane as the center bit is viewed in the direction of rotation.

8. The drilling tool according to claim 1 wherein each cutting edge of the center bit defines a total length, the first part edge together with its associated transition edge portion occupying 10–60% of such total length.

9. The drilling tool according to claim 8 wherein the first part edge together with associated transition edge portion occupies 20–50% of the total length.

10. The drilling tool according to claim 1 wherein the second part edges of the center bit are all tangent to an imaginary inscribed circle whose center coincides with a center of the center bit; a diametrical reference plane of the circle oriented parallel to any one of the second edge parts divides the center bit into two halves that are mirror images of one another; each transition edge portion transforming into its associated first edge part along a convex curve, and transforming into its associated second edge part along a concave curve, an imaginary line extending tangent to the convex and concave curves forming an angle of 10–30 degrees with the diametrical reference plane.

11. The drilling tool according to claim 10 wherein an imaginary line tangent to the circle at a point of intersection between the transition edge portion and its associated second part edge, is parallel to its associated first part edge and spaced therefrom by a distance which is 2–15% of a diameter of the circle.

12. The drilling tool according to claim 11 wherein the distance is 2–5% of the diameter of the circle.

13. The drilling tool according to claim 10 wherein each cutting edge of the center bit further includes a third part edge extending from its associated second part edge at an angle greater than zero degrees.

14. The drilling tool according to claim 1 wherein each first part edge is disposed on a projection extending from a side of a main part of the center bit, the projection having a shorter thickness than the bit, wherein a portion of the side located between the projection and a bottom of the bit defines a support surface of the center bit.

15. An indexable drill bit having a generally quadrangular basic shape and comprising four identical cutting edges;

each cutting edge comprising first and second part edges joined together by a transition edge portion; the second part edges all lying tangent to an imaginary inscribed reference circle; a diametrical reference plane of the circle extending parallel to any one of the second part edges divides the bit into halves which are reverse mirror images of one another; the transition edge portion joining the associated first and second edge parts by a convex curve and a concave curve, respectively; wherein a line oriented tangent to the concave curve and the convex curve forming an angle of 10–30 degrees with the diametrical reference plane, wherein the first part edges are spaced outwardly from the circle.

16. The indexable bit according to claim 15 wherein an imaginary line tangent to the circle at a point of intersection between the transition edge portion and its associated second part edge is parallel to the associated first part edge and spaced therefrom by a distance which is 2–15% of a diameter of the circle.

17. The indexable bit according to claim 16 wherein the distance is 2–5% of the diameter of the circle.

18. The indexable bit according to claim 15 wherein each cutting edge further includes a third part edge extending from its associated second part edge at an angle greater than zero degrees.

19. The indexable bit according to claim 15 wherein each part edge is formed on a projection extending from a side of a main part of the bit, the projection having a shorter thickness than the bit, wherein a portion of the side located between the projection and a bottom of the bit defines a support surface of the bit.

* * * * *